Figure 1:
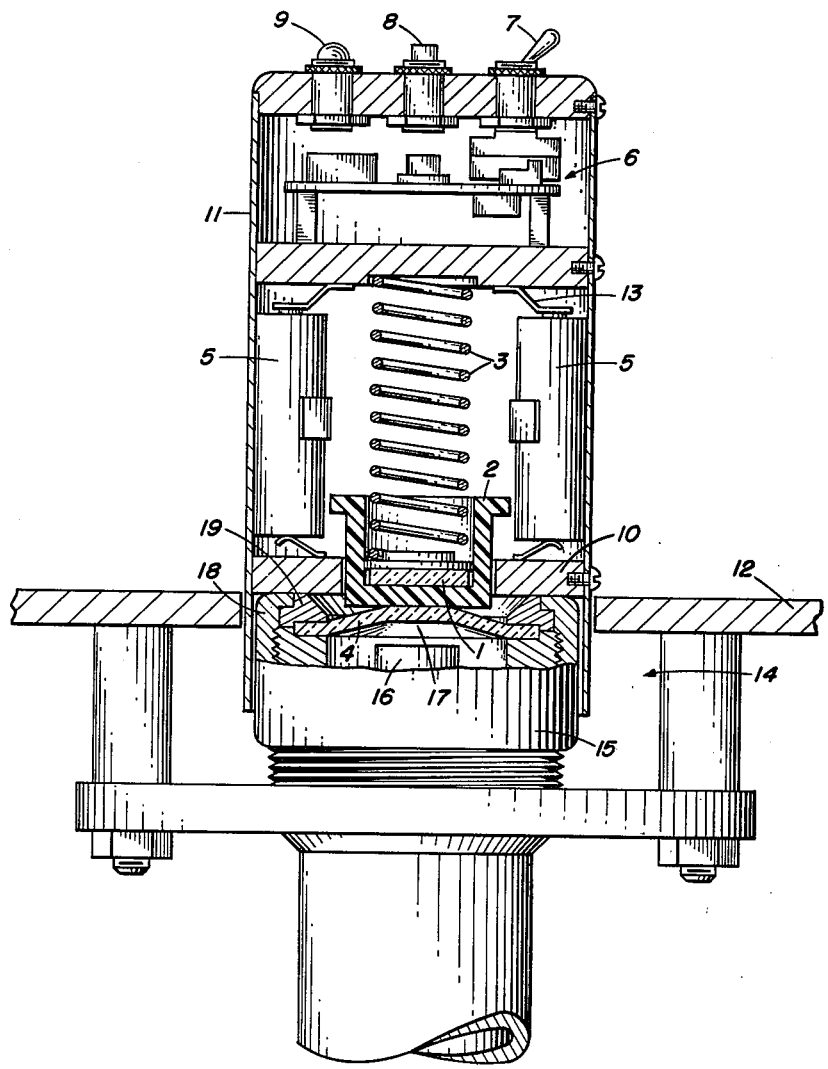

Jan. 26, 1965    R. A. DARBY ETAL    3,167,150
RADIATION LEVEL INDICATOR FOR SONAR PROJECTORS
Filed Sept. 22, 1961    2 Sheets-Sheet 1

INVENTORS
RONALD A. DARBY
FRANK P. HODGES
WILLIAM L. LETSCH

BY

ATTORNEYS

INVENTORS
RONALD A. DARBY
FRANK P. HODGES
WILLIAM L. LETSCH

ATTORNEYS

United States Patent Office 3,167,150
Patented Jan. 26, 1965

3,167,150
RADIATION LEVEL INDICATOR FOR SONAR PROJECTORS
Ronald A. Darby, Annapolis, and Frank P. Hodges and William L. Letsch, Baltimore, Md., assignors, by mesne assignments, to the United States of America as represented by the Secretary of the Navy
Filed Sept. 22, 1961, Ser. No. 140,146
5 Claims. (Cl. 181—.5)

This invention relates to a testing system for sonar projectors and more particularly to a transducer and electrical test circuit for indicating electrically the acoustic output of a sonar projector.

The test evaluation of sonar transducer is best accomplished by placing them in the water and measuring the typical underwater output by means of a calibrated hydrophone. However, quite often, in the case of the fixed-hull mounted transducer, it is extremely desirable to evaluate the transducer while it is out of the water and accessible for repair or replacement. Moreover, it is further desirable to test a sonar projector while "on the shelf" and not as yet installed in an underwater environment. Thus, it would be expedient to have a device that would be able to test radiation levels from transducers mounted on ships while in dry dock or while unmounted before installation.

In the past, accurate quantitative tests of sonar projectors have been accomplished by removing the unit and testing it in a tank. This method of testing is both time consuming and expensive. A simple test sometimes performed has been to strike the transducer with an object and to observe the electrical pulse generated at the receiver. Of course, this method could hardly be termed quantitative or representative of typical test conditions. Non-acoustical checks, such as measuring electrical impedance, are often performed; but these methods do not guarantee a proper acoustic radiation from the transducer window. Sometimes a poorly cemented joint or a gas bubble in the transducer transmission fluid will greatly attenuate the sonic energy, and such defects are not detectable by purely electrical measurements.

The instant invention has solved this problem of "on the shelf" testing of acoustic output of sonar projectors by providing a portable testing device that may be hand-held against the activated sonar transducer so as to determine whether the transducer radiates the required acoustic output level. The device of the present invention contains an electro-acoustic head which, when coupled to the transducer, converts the acoustical energy to an electrical output which is in turn processed by an electronic test circuit to give a reading. The reading may be quantitative or simply an "acceptable–not acceptable" indication.

There are further advantages to the invention. The instant radiation level measuring device allows the transducer in question to be quantitatively tested and evaluated in an extremely short test time because it has dispensed with the need for removing the unit from the ship and may be performed whether the ship is in the water or in dry dock. The transducer may even be tested while "on the shelf." No external power supplies are required. Of course, the transducer must be one that is capable of operating in air without damage to itself, but many high frequency systems can do this at maximum power while many others may be adjusted to a permissible power level where the acoustic output will still be sufficient for the test.

The instant invention has solved the above problems with the further advantage over the former test devices used of a radical reduction in test time, that is from many hours of checking sonar lines to a total of about ten minutes presently. It further provides good accuracy and consistent acoustic coupling from one transducer to the next as well as dependable, reproducible test results from one sonar system to the next in actual practice. Actual field results have assured that the simple mechanical assembly provided can yield consistent acoustic coupling from one transducer system to the next and thus produce reproducible test readings. Of course, a radical reduction in cost of test equipment has followed as a result of the above simplification of equipment and saving in manhours of test time. A further saving in test time is achieved by providing a test device that yields a simple "go–no go" read-out.

An object of the invention is to provide a radiation level indicator for sonar projectors that is capable of testing such projectors while mounted on ships in dry dock, mounted above the water line, or while "on the shelf."

Another object is to provide a portable sonar testing device that can be hand-held and simply operated.

A further object is to provide a sonar test device with an electro-acoustic head which converts acoustical energy to electrical energy when coupled to a transducer and processes it to indicate the radiation level.

An additional object is to provide a sonar projector tester with a read-out of high resolution and, alternatively, a simple "go–no go" reading using the same basic system.

A further object is to provide a radiation level tester requiring a minimum amount of test time without sacrificing accuracy.

Still a further object is to provide a sonar test device of compact size and portability, being self-contained and requiring no external power supplies or test lines.

Yet another object is to provide a sonar projector test device using an auxiliary piezo-electric element to convert the acoustic output to electrical energy and using a read-out circuit to display the output.

Another object of the present invention resides in the provision of a mechanical assembly for sonar testing that assures consistent acoustic coupling from one transducer to the next by the simple expedient of manually pressing a portable test set onto a radiating sonor transducer.

A still further object is to incorporate an acoustic head with a portable electronic assembly that gives a visible indication of the acoustic radiation level of the sonar transducer.

Figure 2:
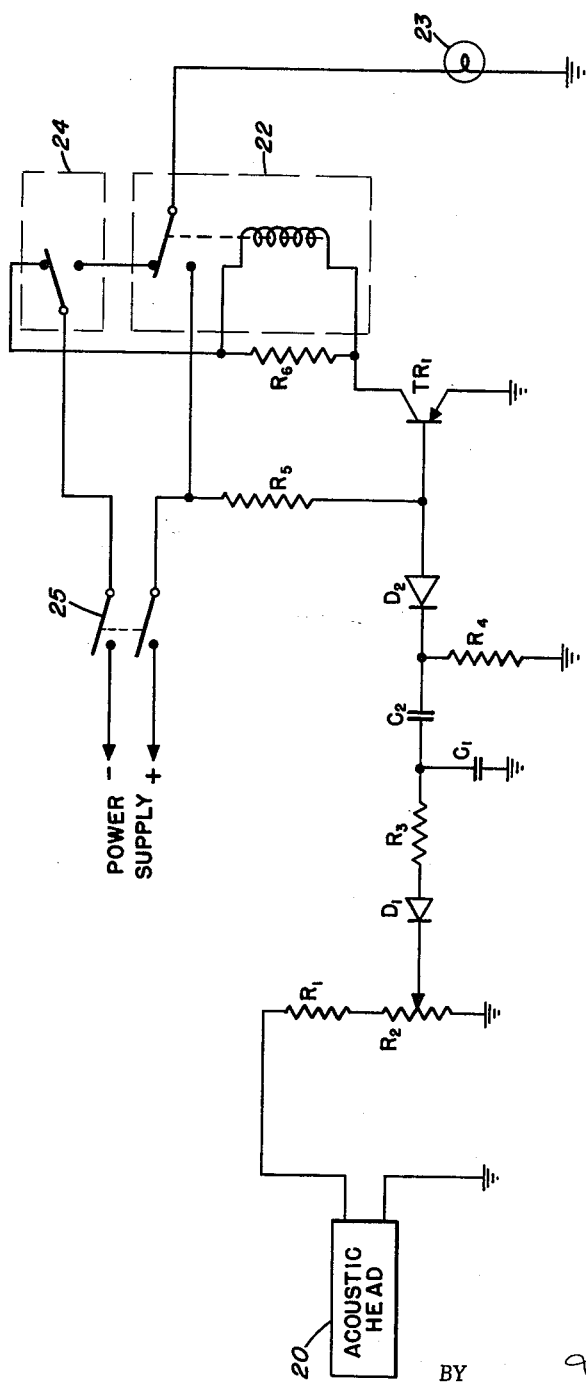

Other objects and many of the attendant advantages of this invention will be readily appreciated as the same becomes better understood by reference to the following detailed description when considered in connection with the accompanying drawings wherein:

FIG. 1 is a sectional elevation of the mechanical portions of the test device shown in "test-position" as applied to a sonar transducer while on the ship's hull; and FIG. 2 is a circuit diagram of the electrical system for measuring the output from the test transducer and presenting it for display.

In the illustrated embodiment of the invention, as shown in FIG. 1, the test housing 11 is shown in actual test-position for testing the radiation window of a sonar transducer 4 while located in the hull 12 of the ship. The test ends of housing 11 are arranged to surround and mate with the sonar housing 15 so as to locate the test transducer 1 in a fixed position of test orientation. In most cases this orientation would be central of the radiation window 4 and, of course, must be constant from transducer to transducer. In the typical test arrangement for "on hull" testing, water is poured on the radiating window 4 of the sonar transducer in order to promote better acoustic coupling. The Lucite acoustic head 2, containing a cemented piezoelectric disc 1, is pressed against the radiating window by the operator. The distance of insertion against the window 4 is kept constant by the provisions of annular retainers 10 mounted within housing 11, further serving to locate the position of the Lucite acoustic head 2 containing crystal 1. These retainers 10 abut against the external lips 18 of the sonar housing 15 and are stopped thereby. Given a firm grip by the operator of this portable unit against the housing 15, coil spring 3 will provide a constant predetermined degree of test pressure urging Lucite window 2 against sonar window 4 (Lucite head 2), providing a fixed bias against the sonar window 4 and, with the water poured between the two devices, provides a constant acoustic coupling of the test set to the sonar projector. Hence, constant reproducible test conditions are maintained from projector to projector. In actual operation, this simple mechanical arrangement provides a quick portable test on the ship installation by an operator who need not necessarily be especially skilled. The invention has effected a substantial saving in operating time and cost of equipment, without sacrificing the desired level of accuracy and consistency in the test readings.

The acoustic pulse from the sonar transducer is converted to an electrical pulse by the piezoelectric element 1 in the acoustic head 4 and is then processed for read-out by the electronic circuit 6. On the top of the unit, indicator lamp 9 serves as a satisfactory display for reading "threshold level" of radiation. This is the simple "go-no go" reading that is adequate when a quick reading is important and need only indicate whether or not the sonar transducer is maintaining a minimum of radiation output.

The other components in the test package include power pack 5, resiliently mounted within the housing 11 and spaced by resilient struts 13, as well as the reset and test control 8 and the on-off switch 7. This test package constitutes a light, portable yet adequate, testing device for an on-the-spot check of any acoustic transducer in the field.

In actual field operation, the radiation test device described could be manipulated by the operator as follows: When on a test location and ready to perform the test check-out of the acoustic transducer radiation, the operator would first turn the switch 7 to the "on" position. Next he would check lamp 9, by depressing the reset button 8 to energize it. This impresses the power supply voltage across the lamp and energizes it if it is operative so that the operator can spot a dead lamp before wasting his time on a test reading. Next the operator would set the test end of the housing 11 over the transducer housing 15 to locate the first crystal in a fixed determinable position against the transducer window 4. Having thus positioned the housing, the operator would then press the housing in against the projector housing until it is stopped by the retainers 10 which bear against the other edge of the projector housing 18. At this point the Lucite acoustic head 2 will be bearing against the projector window 4 with a predetermined degree of force, set according to the bias of coil spring 3. Thus, the piezoelectric crystal 1, for test purposes, is located in a predetermined position and with a predetermined force upon the projector window 4 whose radiations are to be tested and evaluated. Here it is noted that if the projector is of a type which does not operate in air satisfactorily, although many high frequency systems can do this at maximum powers and others may be adjusted to a permissable power level, a water medium may be inserted upon and against the projector window 4 to provide a projection. This is done just before the insertion of the test end of housing 11 over the projector housing.

In FIG. 2 is illustrated the schematic of the electronic package. The output from the acoustic head, namely the piezoelectric crystal which is converting the acoustical energy to electrical energy for test and read-out purposes, is fed into a voltage divider R1, R2. This divider incorporates a trim pot, allowing varying voltage levels to be picked off. The R.F. voltage envelope is detected, producing an negative D.C. level of the same magnitude as the R.F. voltage input. Thus is effected conventionally using diodes D1 and D2 and an R.C. filter associated therewith, namely R3 and R4, C1 and C2. This D.C. voltage is used to switch the transistor R1 to an "on" condition from an "off" condition. This transistor is of the thyrister type, which is similar in operation to a thyratron. Once the transistor is switched to its conducting state, no signal at its base is needed to maintain it in the conducting state. When the R.F. voltage level from the acoustic head exceeds the amplitude needed to switch the transistor, the relay coil switch 22, which is in the collector circuit of the transistor, is energized and closes the circuit, lighting lamp 23 to indicate a satisfactory R.F. acoustic output level to the operator. Here it is to be noted that switch 25 of the circuit is functionally the same as switch 7 in FIG. 1 and switch 24 is the same as reset-test switch 8 in FIG. 1. Loading resistors R5 and R6 may be of any convenient value according to the requirements of TR 1.

Thus, a self-contained system needing no external power supplies or accessories and operable by the simple manipulation of the switches and housing of the test device has been completely disclosed. The attendant benefits in savings of time, cost of equipment and ease of testing in any environment by any operator however unskilled should be apparent. This is especially true in the case of a sonar system for a submarine or other armament vehicle where it is desirable to test quickly in the field or in dry dock without providing complex test apparatus and without dismantling the entire unit and thereby changing its environmental characteristics.

Obviously many modifications and variations of the present invention are possible in the light of the above teachings. It is therefore to be understood that within the scope of the appended claims the invention may be practiced otherwise than as specifically described.

What is claimed is:

1. In an acoustic projector testing device of the type which needs no special test environment, the combination comprising an acoustic projector, mounting means supporting said projector, locating means connected to said mounting means, a test housing having a test end and a read-out end, said test housing having positioning means arranged to cooperate with said locating means to locate the housing in a test position and having transducer means disposed within said housing so as to assume a position along a test-axis normal to said projector when said positioning means assumes its test position and further having spring means resiliently mounting said transducer so as to allow it to be compressively urged against said projector for a test reading, electrical signal transferring means operatively connected to said transducer and said read-out end, and signal indicating means operatively connected to said signal transferring means for indicating when said acoustic projector is operating satisfactorily.

2. A device as described in claim 1 wherein said positioning means comprises a tubular end so shaped as to closely surround said support means, and stop means within said tubular end to determine the degree of insertion during test.

3. A device of the type described in claim 2 wherein said transducer means is a piezoelectric crystal and is affixed within said test housing and positioned by said stop means so as to take a predetermined test position against every projector tested.

4. In a device for testing the output of an electric to acoustic signal transducer, the combination comprising; mounting means for mounting the transducer, locating means affixed to said mounting means for positioning a test device for the transducer, a test transducer for receiving the acoustic output of the transducer being tested, a signal indicator, electrical circuitry connecting said test transducer to said signal indicator, housing means partially enclosing said test transducer, said indicator, and said electrical circuitry, said housing means having a first end and a second end, said first end partially enclosing said test transducer and having a portion extending to engage the locating means on the mounting means for the transducer being tested to thereby form an acoustic connection between the transducer being tested and said test transducer, stop means adjacent said first end within said housing means to limit the projection of said first end into said locating means, said stop means having an opening therein to allow passage of said test transducer therethrough, said second end of said housing means partially enclosing said signal means, said electrical circuitry being located between said first and second ends, spring means within said housing means, said spring means having one end engaging said test transducer and its opposite end supported within said housing to thereby bias said test transducer through said stop means into acoustic engagement with the transducer being tested.

5. A device for testing the output of an electric to acoustic transducer such as that defined in claim 4 wherein said electrical circuitry connecting said test transducer to said signal means comprises; a signal lamp, a power supply, and a solenoid, first switching means for connecting said power supply to said solenoid, second switching means actuated by said solenoid for connecting said power supply to said signal lamp, said test transducer being electrically connected to said first switching means whereby said first switching means is actuated by the output from said test transducer to thereby actuate said signal lamp when the transducer being tested is operating satisfactorily.

References Cited by the Examiner

UNITED STATES PATENTS

| | | | |
|---|---|---|---|
| 2,043,983 | 6/36 | Alder | 76—69 |
| 2,494,433 | 1/50 | Erwin | 310—9.1 X |
| 2,573,390 | 10/51 | Blanchard | 181—.5 X |
| 2,827,978 | 3/58 | Henry | 181—.5 |
| 2,837,914 | 6/58 | Caldwell | 181—.5 X |
| 2,918,651 | 12/59 | Podolok et al. | 181—.5 X |
| 3,079,583 | 2/63 | Beitscher | 340—5 |
| 3,098,211 | 7/63 | Gerber | 181—.5 X |

SAMUEL FEINBERG, *Primary Examiner.*

ALDRICH F. MEDBERY, *Examiner.*